Jan. 10, 1961   H. HURVITZ   2,967,998
NON-SCAN SPECTRUM ANALYZER
Filed Aug. 22, 1956

INVENTOR
Hyman Hurvitz

United States Patent Office 2,967,998
Patented Jan. 10, 1961

2,967,998

NON-SCAN SPECTRUM ANALYZER

Hyman Hurvitz, 1313 Juniper St. NW., Washington, D.C.

Filed Aug. 22, 1956, Ser. No. 605,546

19 Claims. (Cl. 324—77)

The present invention relates generally to frequency indicators, and more particularly to devices for indicating on a two-dimensional raster the values of frequencies occurring in a wide frequency band.

It is well known to measure the frequency of a pulse signal by means of a limiter-frequency discriminator, and to associate the latter with a cathode ray tube indicator for visually indicating the responses of the limiter-frequency discriminator to a series of non-overlapping pulses occurring in a frequency band. The practical difficulty with such devices is that no limiter-discriminator is available which is capable of operation over extremely wide bands of frequency.

It is an object of the present invention to provide a system for visually indicating the frequencies of signals in an extremely wide frequency band, by means of limiter-frequency discriminator circuits which have relatively narrow frequency response characteristics.

It is another object of the present invention to provide a system for measuring frequency, in which a wide band of frequencies is divided conceptually into sub-bands, and all the sub-bands are frequency analyzed by means of a single limiter-discriminator, common to all the sub-bands.

It is a further object of the invention to provide a system of frequency analysis, in which is employed a super-heterodyne F.M. receiver, having a local oscillation generator which generates multiple frequency oscillations simultaneously, each of which may generate a response in the receiver, together with a single visual indicator of the cathode ray tube type, which simultaneously presents the responses of the receiver, each distinguishably from the others.

The above and still further objects, features and advantages of the present invention will become apparent upon consideration of the following detailed description of one specific embodiment thereof, especially when taken in conjunction with the accompanying drawings, wherein.

Figure 1:
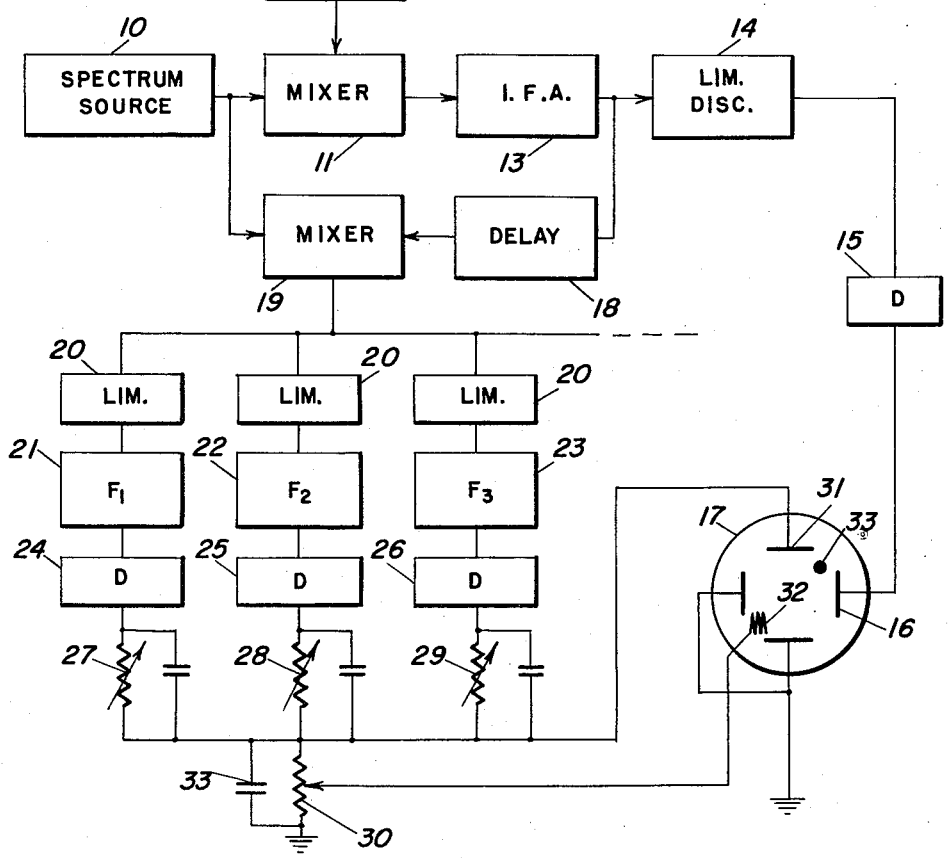
Figure 1 is a block diagram of a system according to the present invention.

In the system of Figure 1, the reference numeral 10 denotes a spectrum source. The spectrum is that of randomly occurring short pulsed carriers occurring in the frequency band $f_1$ to $f_2$. It may be assumed that the pulses do not overlap. The spectrum provided by source 10 is applied to a mixer 11 for heterodyning with a series of harmonically related frequencies $F_1$, $F_2$, $F_3$ . . . , separated by $$\frac{f_2-f_1}{n}$$

where $n$ is an integer, and derived from harmonic local oscillator 12. The heterodyne output of mixer 11 is applied to an I.F. amplifier 13, having a response band $F_2-F_1$, or $$\frac{f_2-f_1}{n}$$

which are the same thing. The output of I.F. amplifier 13 is applied to a limiter-discriminator 14, and the output of the latter is detected in detector 15, and applied to the horizontal deflection electrodes 16 of a cathode ray tube indicator 17.

Accordingly, if any frequency in the band $f_1$ to $f_2$ occurs, it will be heterodyned within the acceptance band of the I.F. amplifier 13 by some one of the local oscillator frequencies $F_1$, $F_2$, $F_3$ . . . A horizontal deflection of the beam of indicator 17 will then occur, which will not represent the frequency of the incoming signal at 10, but rather the position of the signal within one of sub-bands $$\frac{f_2-f_1}{n}$$

each of which may be assumed to heterodyne with a different one of local oscillator frequencies $F_1$, $F_2$, $F_3$ . . . so as to fall within the pass band of I.F. amplifier 13. The problem remains, to indicate with respect to which one of the local oscillator frequencies conversion or heterodyning took place.

The output of I.F. amplifier 13 is applied via a very short time variable delay line 18 to a second mixer 19. The delay is assumed less than any pulse period subject to analysis. The spectrum deriving from source 10 is also applied to mixer 19, and the resulting conversion frequency applied to amplitude limiters 20. This conversion frequency will equal the local oscillator frequency which effected heterodyning in mixer 11.

The limiters 20 supply signals to parallel connected narrow pass-band filters 21, 22, 23 . . . which are respectively tuned to the frequencies $F_1$, $F_2$, $F_3$ . . . The outputs of each of filters 21, 22, 23 . . . is detected in a separate detector 24, 25, 26 . . ., respectively, and the detector loads are represented as variable resistances, as 27, 28, 29, each shunted by a by-pass condenser, in the usual fashion. The resistances 27, 28, 29 are selected to be of increasing magnitudes, respectively, so that in response to frequency $F_1$ will appear a voltage $V_1$ across the resistance 27, in response to frequency $F_2$ will appear a larger voltage $V_2$ across resistance 28, and so on. The several resistances 27, 28, 29, are all connected to ground via a common relatively large resistance 30. Accordingly, the voltage which appears across resistance 30 is a direct function of the one of frequencies $F_1$, $F_2$, $F_3$ . . . which passes through limiters 20.

The voltage appearing across resistance 30 is applied to vertical deflection electrodes 31 of indicator 17. Accordingly, when any deflection of the beam of indicator 17 occurs in response to the frequency of a pulsed carrier signal occurring in source 10, two coordinate deflections will occur. These will be (1) a horizontal deflection representative of frequency position of $f_0$ within a sub-band, and (2) a vertical deflection representative of the position of the sub-band within the main band $f_1$ to $f_2$, as indicated by the identity of the local oscillator frequency which effected conversion from $f_0$ to the I.F. amplifier 13.

The function of delay line 18 is to discriminate against noise, or other signals which may be shorter than desired signals. If two signals, one deriving from source 10, and the other from I.F. amplifier 13, do not overlap at mixer 19 there will be no output. The delay line 18 may then be set to exclude pulses of less than some predetermined value from the vertical deflection elements of the system. It may obviously be omitted.

If desired, some of the voltage at resistance 30 may be applied to intensify the beam of indicator 17, via intensity control grid 32, and in such case the beam may be normally, i.e., in absence of signals, biassed off.

The time constants of the loads for detectors 27, 28, 29 . . . may of course be selected to respond to the pulses to be indicated, and to this end resistance 30 is also shunted by a suitable by-pass condenser 33.

It will be clear that in operation a frequency $f_0$ will combine in mixer 11 with one of local oscillator frequencies $F_1$, $F_2$, $F_3$, to provide a conversion product in the I.F. band. Say the selected value is $F_2$. The I.F. frequency may then be $f_2-f_0$, assuming the local oscillator frequencies all to fall above the band $f_1$ to $f_2$. The output of mixer 19 will then be $F_2-f_0+f_0=F_2$.

Figure 2:
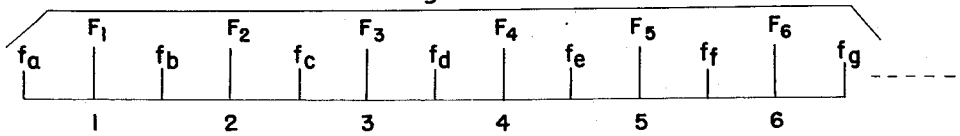
Figure 2 is a diagram illustrating certain frequency relations.

A further feasible arrangement of frequencies is indicated in Figure 2. Here a portion of the band $f_a$ to $f_n$ . . . is shown, and the local oscillator frequencies $F_1$, $F_2$, $F_3$ . . . $F_n$ are shown each at the central point of a sub-band of the band $f_1-f_2$ which is $$\frac{f_n-f_a}{n}$$

The use of any specific member of sub-bands is of course arbitrary. The I.F. amplifier may now have a band width from 0 to $F_1-f_a$, or $$\frac{f_n-f_a}{2n}$$

where $n$ is the number of sub-bands, or $$\frac{F_2-F_1}{2}$$

These values are all equal.

In such case a frequency $f_0$ within the band $f_a$ to $f_n$ will always convert to the I.F. band, as $F_n-f_0$ or $f_0-f_n$, one or the other, and it will be of no consequence which conversion takes place.

The apparent fault exists in the latter arrangement that if $f_0=F_n$ the frequency applied to I.F. amplifier 13 will in fact be zero, or D.C., and indistinguishable from no signal at all. This is in fact not possible, since short pulses of the type for which this system is designed have no single pulse carrier frequency, but a frequency distribution of carrier energy about a mean value.

Still a further possibility is to select an I.F. channel of one-half sub-band wide, starting at $F_2-F_1$, or a band equal in width to $$\frac{F_2-F_1}{2}$$

starting at $$\frac{F_2-F_1}{2}$$

at its lower edge. These latter choices eliminate the possibility of a zero frequency conversion factor.

So, referring to Figure 2 of the accompanying drawings, and specifying exemplary frequency values, a spectrum of frequencies $f_a$ to $f_k$ is to be examined, where $f_a=100.$ mc. and $f_k=200.$ mc. This band may be divided into ten sub-bands as follows:

$f_a$ to $f_b=100.$ to 110. mc.
$f_b$ to $f_c=110.$ to 120. mc.
. . . . . . . . . . . . . . . .
$f_j$ to $f_k=190.$ to 200. mc.

Local oscillator frequencies may be selected as follows:

$F_1=105.$ mc.
$F_2=110.$ mc.
. . . . . . . . .
$F_{10}=205.$ mc.

For an I.F. bandwidth of 5 mc. the following possibilities exist, which are exemplary only:

(1)                    0–5 mc.
(2)                    10–15. mc.
(3)                    5–10. mc.

It will be observed that all the suggested ranges of values for I.F. frequencies introduce ambiguities, if the input frequency $f_0$ occurs at the boundary of two sub-bands. This is not a fatal difficulty since the values of resistances 27, 28, 29 . . . may be made small relative to the value of resistance 30. The effect of two responses from filters 21, 22, 23 at the same time is then readily interpretable. For example, resistance 27 may equal 1000. ohms, resistance 28=2000. ohms, resistance 29=3000. ohms, while resistance 30 may equal 20,000 ohms or more. For choice 1 a carrier frequency $f_0$ of 110 mc. will generate five mc. I.F. frequencies due to both $F_2$ and $F_1$. The I.F. frequency of 5 mc. will recombine in mixer 19 to provide output frequencies of 105 and 110 mc., i.e., at frequencies $F_1$ and $F_2$. The total vertical deflection of indicator 17 will be that due to a fixed voltage E across 1000. and 2000. ohms in parallel, =1500 ohms, in series with 20,000 ohms. The response will therefore be mid-way between the response for either frequency alone, and will be readily interpreted.

The visual indication 33 on the face of cathode ray tube indicator 17 indicates by its abscissa or horizontal deflection the position of an incoming signal of frequency $f_0$ with respect to any two adjacent local oscillator frequencies $F_1$, $F_2$, $F_3$. Its vertical position indicates which one of the local oscillator frequencies in fact converted $f_0$ to within the acceptance band of intermediate frequency amplifier 13.

Both the abscissa and ordinate of indication 33 are required completely to identify the frequency of a signal.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. A frequency indicator for a wide frequency band made up of a plurality of sub-bands comprising a visual indicator including means for generating a mark deflectable in two coordinate directions, means responsive to a frequency in said band for deflecting said mark in one of said coordinate directions in accordance with the position of said frequency within any one of said sub-bands, said means comprising a frequency discriminator circuit, and means for deflecting said mark in the other of said coordinate directions in accordance with the position of said any one of said sub-bands within said wide frequency band.

2. A frequency indicator for a wide band of frequencies, comprising a visual indicator having means for generating a mark, and means for deflecting said mark in first and second coordinate directions in response to first and second deflection signals respectively, means comprising a relatively narrow intermediate frequency amplifier, a mixer, and a source of multiple local oscillator frequencies for heterodyning any frequency in said wide band to another frequency in the pass band of said intermediate frequency amplifier, a circuit coupled to said intermediate frequency amplifier for deriving a first deflection signal representative of the position of said another frequency in said pass-band, and means for generating a second deflection signal in accordance with the approximate position of said any frequency within said wide band.

3. A frequency indicator for a wide band of frequencies made up of narrow equally wide sub-bands, comprising a mixer, a source of harmonically related local oscillations having separations equal to the width of said sub-bands, means coupling said source of harmonically related local oscillations with said mixer, a source of a discrete frequency occurring within said wide band of frequencies and therefore within one of said sub-bands, means coupling said source of a discrete frequency with said mixer, an intermediate frequency amplifier having a width equal substantially to the width of said sub-bands multiplied by the factor $n$, where $n$ is selected from the values 1 and ½, means for generating a first signal of amplitude representative of the position of said discrete frequency within said one of said sub-bands, means for generating a second signal of amplitude representative of the position of said one of said sub-bands within said wide band, and means responsive to said signals for generating a visual mark representative simultaneously of said amplitudes of said signals.

4. A frequency indicator for a wide band of frequencies made up of narrow equally wide sub-bands, comprising a source of essentially single frequency signals of frequency falling wtihin said wide band at random position and therefore within some one only of said sub-bands, a harmonic local oscillator arranged to generate plural harmonically related local oscillations, means comprising said harmonic local oscillator for heterodyning signals within any of said sub-bands to one relatively narrow intermediate frequency band, and a frequency discriminating circuit for generating a single voltage representative of the frequency position of any signal within said intermediate frequency band.

5. A frequency indicator for a wide band of frequencies made up of relatively narrow equally wide sub-bands, comprising a source of a single frequency having a position at random with respect to some one only of said sub-bands, and means comprising a frequency discriminator circuit for generating a single voltage having an amplitude representative of the position of said a single frequency within that one of said sub-bands in which said single frequency occurs and having said amplitude, regardless of the position of said sub-band in said wide band of frequencies.

6. The combination in accordance with claim 5, wherein is further provided means for generating a single voltage representative of the position of the sub-band within said wide band of frequencies in which said single frequency occurs.

7. A frequency indicator for a wide band of frequencies made up of narrow equally wide sub-bands, comprising a source of a signal of single frequency having a position at random with respect to any one of said sub-bands, means for generating responses at a plurality of discrete frequencies each in response to presence of said signal in a different one of said sub-bands, means for combining said responses, and means responsive to said means for combining for generating a single voltage having an amplitude representative of the value of said one of said discrete frequencies.

8. A system for analyzing frequencies within a wide band made up of equal narrow sub-bands, comprising means for converting a signal in any of said sub-bands to a further signal on a common band of frequencies having a width equal to the width of one of said sub-bands, said means for converting including a source of harmonically related simultaneously existent oscillations for combining all simultaneously with said signal in any of said sub-bands, said oscillations including frequencies spaced by approximately the width of said sub-bands and means coupled to said means for converting for generating a voltage having an amplitude representative of the said further position of a signal with respect to said common band of frequencies.

9. The combination in accordance with claim 8, wherein is provided means for generating further voltages each of amplitude representative of the identity of one of said sub-bands in response to presence of signal anywhere in that sub-band.

10. A spectrum analyzer, comprising, a source of input signals subsisting in a wide band and non-overlapping in time, a frequency converter including a local oscillator arranged to provide a simultaneous plurality of equally frequency spaced local oscillations, an intermediate frequency amplifier arranged to pass a signal derived from said frequency converter by conversion of only one of said local oscillations with any of said input signals, and a device for generating a display having a characteristic representative of the frequency position of said signal passed by said intermediate frequency amplifier within the pass band of the latter.

11. The combination according to claim 10, wherein is further provided means for frequency converting said signal passed by said intermediate frequency amplifier with said input signal to derive a further signal at the frequency of said one of said local oscillations, and means for indicating the frequency value of said one of said local oscillations.

12. The combination according to claim 11, wherein said last means includes a plurality of discrete filters each arranged to pass one only of the frequencies of said local oscillations.

13. The combination according to claim 12, wherein is provided means for converting the frequencies passed by said filters to signals of discrete amplitudes each representative of one of the frequencies passed by said filters, a single lead, and means for applying said signals of discrete amplitudes representative of the frequencies passed by said filters to said single lead.

14. The combination according to claim 13, wherein said device for generating a display includes an indicator having a deflectable visual display generating element, and means responsive to said signals of discrete amplitudes for deflecting said visual display generating element to positions representative of said discrete amplitudes.

15. The combination according to claim 14, wherein said indicator is a cathode ray tube indicator and said visual display generating element is an electron beam of said cathode ray tube indicator.

16. The combination according to claim 15, wherein said cathode ray tube indicator includes two beam deflection devices, and wherein is provided means for applying said signals of discrete amplitudes to one of said two beam deflection devices.

17. A spectrum analyzer including a source of multiple equally frequency spaced harmonic local oscillations, an I.F. amplifier having a pass band substantially equal to the separations of two adjacent ones of said local oscillations, means responsive to all said oscillations simultaneously for effecting conversion of an input signal to a frequency within the pass band of said I.F. amplifier, and means for indicating as a single indication which one of said local oscillations effected the conversions as well as the frequency position of the converted signal with respect to the pass band of said I.F. amplifier.

18. In a spectrum analyzer, a source of an input signal which may occur at random anywhere in a relatively wide frequency band, means for heterodyning said input signal to a further signal in a relatively narrow frequency band, said last means including a plurality of local oscillation sources having frequencies spaced apart by approximately the width of said relatively narrow band and a mixer responsive to said local oscillations and to said input signal and said further signal to derive another signal having the frequency of that local oscillation which effected said heterodyning of said input signal to said further signal, means for generating a first D.C. signal having an amplitude representative of the frequency position of said further signal with respect to said relatively narrow band, means for generating a second D.C. signal having an amplitude representative of the frequency of said last mentioned local oscillation, and means for generating a visual display representative of the frequency of said input signal in response to said first and second D.C. signals.

19. The combination according to claim 18 wherein said means for generating a visual display includes a cathode ray tube indicator having two coordinate ray deflection devices, means for applying said first D.C. signal to one of said deflection devices and means for applying said second D.C. signal to the other of said deflection devices.

References Cited in the file of this patent

UNITED STATES PATENTS

| | | |
|---|---|---|
| 1,976,481 | Castner | Oct. 9, 1934 |
| 2,001,387 | Hansell | May 14, 1935 |
| 2,019,503 | Page | Nov. 5, 1935 |
| 2,084,760 | Beverage | June 22, 1937 |
| 2,093,871 | Levin | Sept. 21, 1937 |
| 2,500,431 | Potter | Mar. 14, 1950 |
| 2,510,531 | Trevor et al. | June 6, 1950 |
| 2,525,679 | Hurvitz | Oct. 10, 1950 |
| 2,530,693 | Green | Nov. 21, 1950 |
| 2,602,836 | Foster et al. | July 8, 1952 |
| 2,704,807 | Wallace | Mar. 22, 1955 |
| 2,704,808 | Wallace | Mar. 22, 1955 |
| 2,777,953 | Tollefson | Jan. 15, 1957 |